United States Patent [19]
Fingerle et al.

[11] Patent Number: 5,597,088
[45] Date of Patent: Jan. 28, 1997

[54] COOKING POT COVER

[75] Inventors: Hans Fingerle, Riedlingen; Horst Weigand, Ertingen, both of Germany

[73] Assignee: Silt-Werke GmbH & Co. KG, Germany

[21] Appl. No.: 162,073

[22] PCT Filed: Apr. 8, 1993

[86] PCT No.: PCT/DE93/00336

§ 371 Date: Dec. 9, 1993

§ 102(e) Date: Dec. 9, 1993

[87] PCT Pub. No.: WO93/20738

PCT Pub. Date: Oct. 28, 1993

[30] Foreign Application Priority Data

Apr. 10, 1992 [DE] Germany ............... 9205199 U

[51] Int. Cl.[6] ............................................. B65D 25/24
[52] U.S. Cl. ................... 220/662; 220/287; 220/369; 220/772
[58] Field of Search ........................... 220/287, 662, 220/772, 369, 370

[56] References Cited

U.S. PATENT DOCUMENTS

| D. 341,058 | 11/1993 | Slany et al. | |
|---|---|---|---|
| 909,284 | 1/1909 | Collins | 220/287 |
| 2,225,250 | 12/1940 | Rodwick | 220/772 |
| 3,115,229 | 12/1963 | Erhard | 220/772 |
| 4,285,441 | 8/1981 | Ziskind | 220/287 |
| 4,522,311 | 6/1985 | Ikeda | 220/662 |
| 4,700,689 | 10/1987 | Speker | 220/287 |
| 4,828,140 | 5/1989 | Henderson | 220/287 |

FOREIGN PATENT DOCUMENTS

| 334123 | 11/1919 | Germany . |
|---|---|---|
| 218866 | 4/1942 | Switzerland . |

Primary Examiner—Joseph M. Moy
Attorney, Agent, or Firm— Hill, Steadman & Simpson

[57] ABSTRACT

The invention is directed to a cover for a cooking pot, the cover formed by a cover ring fashioned as a zone of an imaginary spherical section directed toward the pot and of a cover surface resting on the cover ring, whereby the width of the cover ring amounts to a few cm and the average ring diameter of the cover ring approximately corresponds to the inside diameter of the pot.

9 Claims, 2 Drawing Sheets

COOKING POT COVER

BACKGROUND OF THE INVENTION

The invention is directed to a cooking pot cover.

Known covers for cooking pots are outwardly concavely arced, i.e., away from the pot. As a rule, they also comprise an annular raised portion whose annular diameter is slightly smaller than the diameter of the edge of the pot.

Given the known covers, pouring liquids off by slightly displacing the cover on the edge of the pot upon formation of a sickle-shaped gap and placing the pot at an angle over a sink is difficult because a gap opening also forms at the side lying opposite the gap, steam emerging therefrom. In order to protect against scalding, the user must thus protect himself at the arms as well as by employing potholders at the hands.

SUMMARY OF THE INVENTION

The object of the invention is to create a pot cover that allows a simpler decanting.

This object is inventively achieved in that the cover surface is formed by a cover ring fashioned as a zone of an imaginary sphere section directed toward the pot and of a circular cover surface resting on the cover ring, whereby the width of the cover ring amounts to a few cm and the average ring diameter of the cover ring approximately corresponds to the diameter of the pot.

It is thereby proposed that the cover ring is provided with an open, all around annular coining that limits the cover ring toward the inside, serves for the acceptance of the cover surface and is directed away from the pot.

A preferred exemplary embodiment is characterized in that the cover surface is fashioned as a viewing glass that quite preferably has the shape of a spherical section directed away from the pot.

The cover surface can be held by an adhesive bead introduced into the annular coining.

A preferred exemplary embodiment is characterized in that the cover handle is composed of two grip members lying opposite one another on that side of the cover ring facing away from the pot and put in place thereon and of at least one gripping bow that connects these gripping members to one another and extends across the viewing glass.

It is further proposed that two gripping bows spaced from one another are provided. The one or the two gripping bows preferably proceed curved with a radius corresponding to the radius of curvature of the viewing glass.

The invention shall be set forth below with reference to a drawing.

DETAILED DESCRIPTION OF THE PREFERRED EMBODIMENTS

Figure 1:
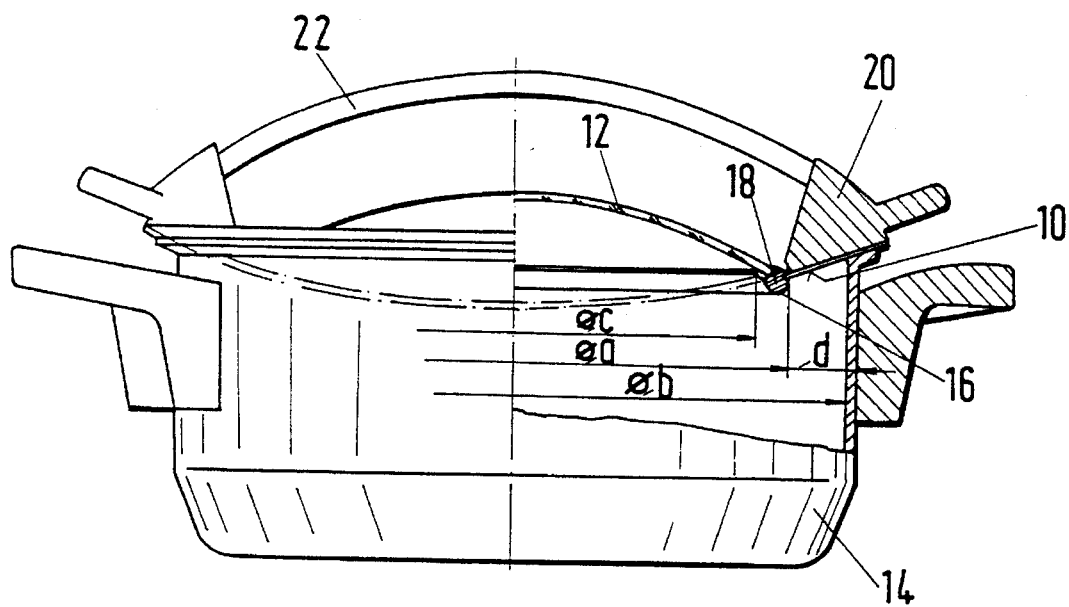
FIG. 1 is a side view of the pot and cover of the invention in partial section.

The cover is composed of a cover ring 10, of a cover surface 12 resting on the cover ring 10 and of a cover handle 20, 22.

The cover ring 10 is fashioned in the form of a spherical zone that forms part of an imaginary spherical section shown in dot-dash lines that is directed downward into the pot.

The average ring diameter, i.e., the spacing of the imaginary axis of the cover from the middle of the cover ring 10 approximately corresponds to the diameter b of the pot. The width of the cover ring amounts to approximately 1 through 3 centimeters.

The cover is provided with an annular coining 16 at that edge directed toward the inside of the pot, this annular coining 16 being open in upward direction, i.e., away from the pot. The annular outside diameter of the annular coining 16 is recited as "a", the inside diameter of the annular coining is recited as "c", the clearance between the annular coining 16 and the edge of the pot is recited as "d".

An adhesive bead 18 is introduced into the annular coining 16, this adhesive bead 18 carrying the cover surface 12 fashioned as viewing glass. The viewing glass 12 is fashioned like a spherical segment in upward direction, i.e. directed away from the pot.

The cover handle is composed of two gripping members 20 lying opposite one another on that side of the cover ring 10 facing away from the pot and put in place thereon and of two gripping bows 22 arranged at a distance from one another that allows them to be grasped. The radius of the gripping bows 22 corresponds to that of the viewing glass 12.

Figure 2:
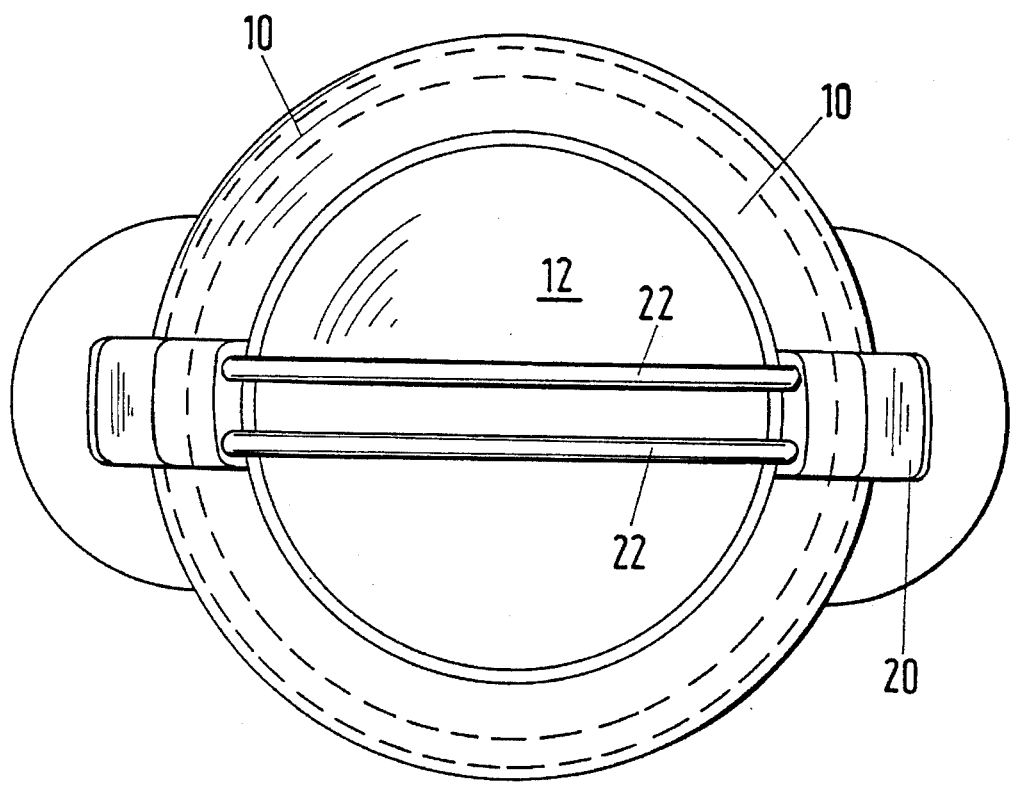
FIG. 2 is a plan view onto the cover shown in FIG. 1.
Figure 3:
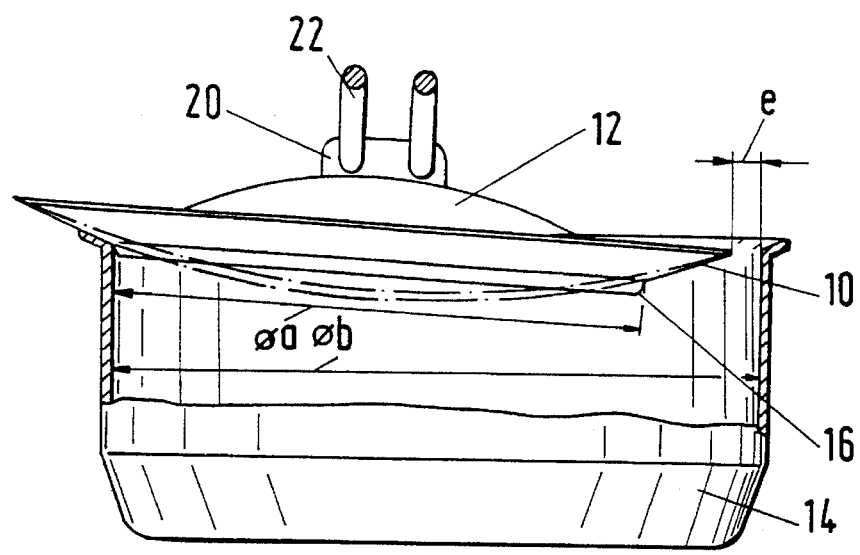
FIG. 3 is a side view in partial section, with the cover shifted relative to the pot.
Figure 4:
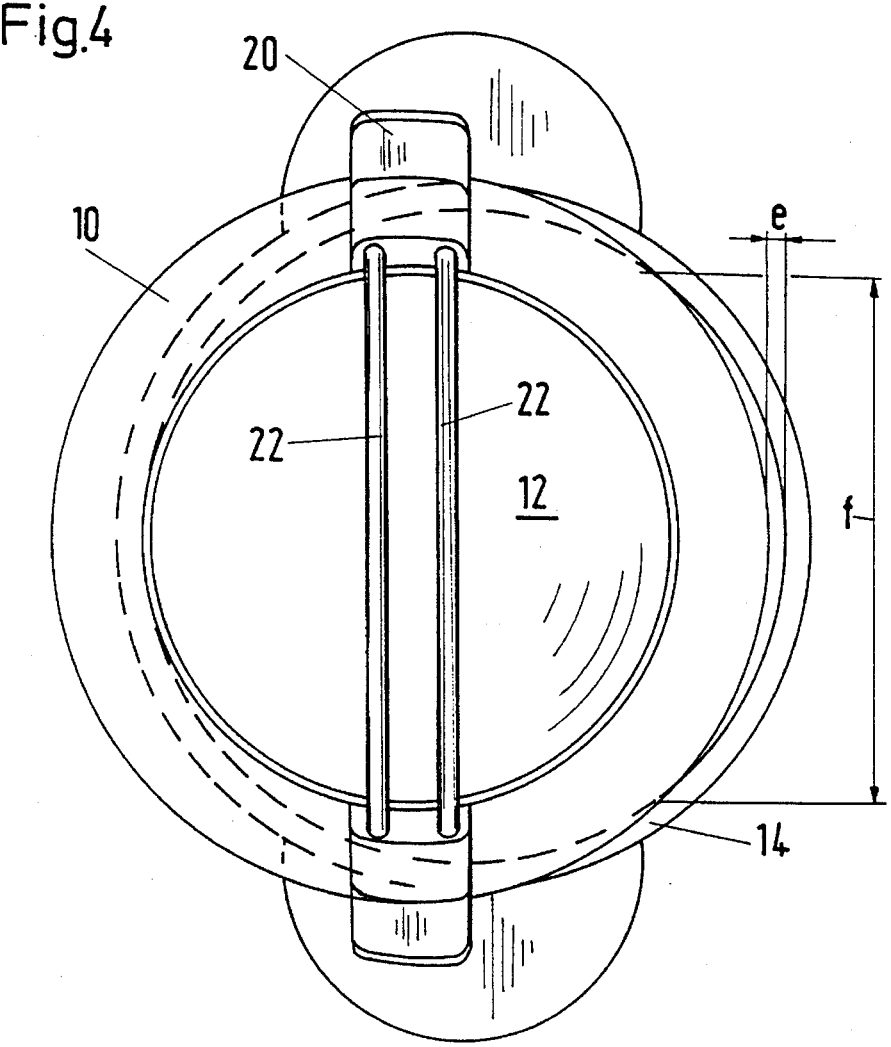
FIG. 4 is a plan view onto the cover and pot in the positions relative to one another as shown in FIG. 3.

When decanting, the cover is moved from the position shown in FIGS. 1 and 2 into the position shown in FIGS. 3 and 4 wherein a sickle-shaped pouring opening having a length f is formed at the one pot edge. The width e of this pouring opening is limited by the annular coining 16 that places itself against the edge of the pot member at that side lying opposite the pouring opening that has been formed.

The spherical zone-shaped, convex fashioning of the cover ring 10 effects the line-shaped or planar placement thereof on the pot edge in that region lying opposite the sickle-shaped pouring opening, also effecting this in the position shown in FIGS. 3 and 4 which allows liquid to be decanted from the pot. An escape of steam and, thus, the risk of scalding are avoided.

The viewing glass 12 inserted into the annular coining 16 which accepts an adhesive bead 18 allows the contents of the cooking pot to be observed during the cooking process. As a consequence of the upwardly directed, spherical section-shaped fashioning of the viewing glass 12, steam that precipitates after condensation runs off toward the edges, so that the viewing glass 12 allows the contents of the pot to be observed during cooking and, in particular, during decanting as well.

The cover handle is composed of two gripping members 20 that lie opposite one another and are put in place on the surfaces of the cover ring pointing away from the pot and of two gripping bows 22 that connect these gripping members 20 to one another and extend over the viewing glass 12 with a spacing therefrom that allows grasping. The radius of curvature of the gripping bows thereby proceeds approximately parallel to that of the viewing glass 12.

Although the present invention has been described with reference to a specific embodiment, those of skill in the art will recognize that changes may be made thereto without departing from the scope and spirit of the invention as set forth in the appended claims.

We claim as our invention:

1. A cover for a cooking pot, comprising:

a cover ring having an annular bottom surface with a shape of a portion of an imaginary sphere having a center point above the pot;

a cover surface substantially closing the cover ring, an average ring diameter of the cover ring approximately corresponds to the inside diameter of a rim of the pot;

said annular bottom surface for flushly resting on the rim of the pot and having a width sufficient to allow displacement of the annular bottom surface on the rim of the pot for decanting through a sickle shaped opening between the rim of the pot and the cover ring while said cover ring otherwise maintains flush contact around said rim to prevent scalding of a user while decanting; and a gripping surface operatively connected to said cover ring for displacing said cover ring by the user for decanting.

2. A cover according to claim 1, wherein the cover ring is provided with an open, all around annular coining that defines a limit of the cover ring toward an inside of the pot, accepting the cover surface, the coining being open away from the pot.

3. A cover according to claim 1 comprising an adhesive bead introduced into the annular coining and holding the cover surface therein.

4. A cover according to claim 1, wherein the cover surface is transparent.

5. A cover according to claim 1, wherein the cover surface has the shape of a spherical section directed convexly away from the pot.

6. A cover according to claim 1, wherein said gripping surface comprises a cover handle that has two gripping members that lie opposite one another extending from the cover ring and at least one gripping bow that joins said gripping members to one another and extends across the cover surface.

7. A cover according to claim 5, comprising at least two gripping bows arranged at a spacing from one another connected to one of said cover surface or said cover ring.

8. A cover according to claim 4, wherein said gripping surface comprises a cover handle having at least one gripping bow connected to said cover ring, and wherein the cover surface has the shape of a spherical section directed away from the pot, and said cover surface being transparent, the gripping bow proceeds parallel to the cover surface at a distance therefrom allowing grasping having a curvature essentially corresponding to the curvature of the cover surface.

9. A cover according to claim 1, wherein the width of the cover ring is approximately in a range between 1 and 3 centimeters.

* * * * *